United States Patent
Phelps et al.

(10) Patent No.: US 7,569,737 B2
(45) Date of Patent: Aug. 4, 2009

(54) METHOD FOR EXCLUDING SALT AND OTHER SOLUBLE MATERIALS FROM PRODUCED WATER

(75) Inventors: Tommy J. Phelps, Knoxville, TN (US); Costas Tsouris, Oak Ridge, TN (US); Anthony V. Palumbo, Oak Ridge, TN (US); David E. Riestenberg, Knoxville, TN (US); Scott D. McCallum, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 839 days.

(21) Appl. No.: 11/171,561

(22) Filed: Jun. 30, 2005

(65) Prior Publication Data
US 2007/0004945 A1   Jan. 4, 2007

(51) Int. Cl.
C02F 1/00 (2006.01)
(52) U.S. Cl. .................. 585/15; 210/711; 203/11
(58) Field of Classification Search ............ 585/15; 210/711
See application file for complete search history.

(56) References Cited

U.S. PATENT DOCUMENTS

| | | | |
|---|---|---|---|
| 2,904,511 A | 9/1959 | Donath | |
| 5,473,904 A * | 12/1995 | Guo et al. | 62/46.1 |
| 5,553,456 A | 9/1996 | McCormack | |
| 5,873,262 A | 2/1999 | Max et al. | |
| 5,964,093 A * | 10/1999 | Heinemann et al. | 62/45.1 |
| 6,028,234 A * | 2/2000 | Heinemann et al. | 585/15 |
| 6,245,955 B1 * | 6/2001 | Smith | 585/15 |
| 6,508,916 B1 * | 1/2003 | Razzaghi et al. | 203/11 |
| 6,598,407 B2 | 7/2003 | West et al. | |
| 6,653,516 B1 * | 11/2003 | Yoshikawa et al. | 585/15 |
| 6,733,667 B2 | 5/2004 | Max | |
| 6,821,439 B1 * | 11/2004 | Currier | 210/711 |
| 7,008,544 B2 * | 3/2006 | Max | 210/708 |

OTHER PUBLICATIONS

W.G. Knox, et al., "The Hydrate Process," Chem Eng Prog, 1961, pp. 66-71, vol. 57, No. 2.
O.R. West, et al., "Negatively Buoyant Co2-Hydrate Composite for Ocean Carbon Sequestration," AIChE J, 2003, pp. 283-285, vol. 49.
S.Y. Lee, et al., "CO2 Hydrate Composite for Ocean Carbon Sequstration," Environ Sci Tech, 2003, pp. 3701-3708, vol. 37.

* cited by examiner

*Primary Examiner*—Ellen M McAvoy
(74) *Attorney, Agent, or Firm*—Scully, Scott, Murphy & Presser, P.C.

(57) ABSTRACT

A method for reducing the salinity, as well as the hydrocarbon concentration of produced water to levels sufficient to meet surface water discharge standards. Pressure vessel and coflow injection technology developed at the Oak Ridge National Laboratory is used to mix produced water and a gas hydrate forming fluid to form a solid or semi-solid gas hydrate mixture. Salts and solids are excluded from the water that becomes a part of the hydrate cage. A three-step process of dissociation of the hydrate results in purified water suitable for irrigation.

9 Claims, 3 Drawing Sheets

METHOD FOR EXCLUDING SALT AND OTHER SOLUBLE MATERIALS FROM PRODUCED WATER

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

BACKGROUND OF THE INVENTION

1. Field of the Invention

The present invention relates to methods for forming solid and semi-solid clathrate hydrate structures useful for removing salt and other soluble materials from water. In particular, a series of completion steps involving pressurization and clathrate formation, depressurization, ice formation and desalting is used to recover the desalted water from the clathrate hydrate structures.

2. Description of Prior Art

Produced water is the raw water that is a byproduct of natural gas and oil production. Produced water contains organic matter, suspended silts and clays, and formation brine. It is commonly re-injected below ground due to the high cost of purification for above ground disposal. In particular, the cost of separating the dissolved formation salts from the water is expensive. An economical method to purify produced water would be of great benefit to oil and natural gas producers, particularly in regions where oil and gas are produced and surface irrigation or stream water is in demand.

Common techniques for the desalination of water include distillation, reverse osmosis and freezing. Distillation involves the evaporation of saline water and collection of the freshwater condensate. Reverse osmosis requires high-pressure pumps to force saltwater through a semi-permeable membrane to produce freshwater. This technique is more expensive due to the costs of membranes and pumps.

Various techniques are used to produce freshwater using a freezing process. Fundamentally, the freezing process relies on the fact that salt is rejected from the ice. In typical freezing processes, cooling elements are located in saltwater. When ice forms on the cooling elements, they are separated from the saltwater, melted, and freshwater is produced.

Hydrate formation is being developed as a desalination technique for use in oceans (McCormack, Ref. 2), (Max, Refs. 3, 5). Such techniques involve the use of a long tube (~100 meters), or a desalination fraction column that is situated to transect the hydrate stability zone, thereby allowing hydrates to form and dissociate in the column. The hydrate forms at the bottom of the column and rises through the column due to its buoyant properties. As the hydrate rises, it crosses into its zone of instability and dissociates to produce freshwater. The freshwater collects at the top portion of the column due to density differences between freshwater and saltwater.

It is also known that solid or semi-solid clathrate hydrate structures can be formed by mixing water and certain gases (gas hydrates) such as carbon dioxide and methane. As the clathrate hydrate structures form, they tend to exclude salt or any dissolved species from the clathrate structure (Donath, Ref. 1), (Knox, Ref. 6). The present invention takes advantage of this feature in a series of completion steps that recover the desalted water.

A technology called coflow injection has been developed at the Oak Ridge National Laboratory for continuous hydrate production. It involves high energy mixing of a hydrate forming fluid and water in a coflow injector, and then ejecting the mixture into a pressurized vessel (West, Refs. 4, 7), (Lee, Ref. 8). It has been observed that when the injected water has solid particles suspended or dissolved in it, the hydrate formation process appears to exclude the solids from the solid hydrate composite.

An advantage of the coflow injection method over conventional batch reactor type hydrate producers is that the injector may be used for continuous hydrate production, and the shape of the produced solid material allows for easier transfer of excluded solids and dissolved species. A further advantage of the coflow injector is the demonstrated ability to precisely control the density.

REFERENCES

1) W. E. Donath, "Method and Apparatus for Producing Purified Water from Aqueous Saline Solutions", U.S. Pat. No. 2,904,511, issued Sep. 15, 1959.

2) R. A. McCormack, "Clathrate Freeze Desalination Apparatus and Method", U.S. Pat. No. 5,553,456, issued Sep. 10, 1996.

3) M. D. Max, R. E. Pellenbarg, "Desalination through Methane Hydrate", U.S. Pat. No. 5,873,262, Feb. 23, 1999.

4) O. R. West, C. Tsouris, L. Liang, "Method and Apparatus for Efficient Injection of $CO_2$ in Oceans," U.S. Pat. No. 6,598,407, Jul. 29, 2003.

5) M. D. Max, "Desalination using Positively Buoyant or negatively Buoyant/Assisted Buoyancy Hydrate", U.S. Pat. No. 6,733,667, May 11, 2004.

6) W. G. Knox, M. Hess, G. E. Jones, Jr., H. B. Smith, Jr., "The Hydrate Process", Chem. Eng. Prog., 1961, Vol. 57(2) pp. 66-71.

7) O. R. West, C. Tsouris, L. Liang, S. Y. Lee, S. McCallum, "Negatively Buoyant $CO_2$-Hydrate Composite for Ocean Carbon Sequestration", AIChE J, 2003, Vol. 49, p.p. 283-285.

8) S. Y. Lee, L. Liang, D. E. Riestenberg, O. R. West, C. Tsouris, "$CO_2$ Hydrate Composite for Ocean Carbon Sequestration", Environ. Sci. Tech., 2003, Vol. 37, pp. 3701-3708.

BRIEF SUMMARY OF THE INVENTION

In a method wherein solid or semi-solid clathrate hydrate structures are formed in a pressure vessel from water containing dissolved materials and a hydrate-forming gas, the additional steps of: depressurizing the pressure vessel to turn the solid or semi-solid clathrate hydrate structures into an ice-like clathrate hydrate mass; washing the ice-like clathrate hydrate mass with unreacted water containing dissolved materials to partially melt the ice-like clathrate hydrate mass and wash out dissolved materials; removing the melt water containing the dissolved materials from the pressure vessel; and melting the remaining ice-like clathrate hydrate mass to recover the purified water therein.

DETAILED DESCRIPTION OF THE INVENTION

The present invention is a series of completion steps for incorporation into any of several desalting, dewatering or soluble material removal/recovery processes that involve the formation of solid or semi-solid clathrate hydrate structures.

Solid and semi-solid clathrate hydrate structures can form when water is mixed with certain gases that can form gas hydrates such as carbon dioxide and methane. In the invention, after the hydrate structure is formed, the more concentrated solute solution can be discharged. As a secondary purification step, a subsequent rapid depressurization below the hydrate stability zone converts the hydrate to ice. The ice may rest on an elevated screen that allows saline water to drain out of the ice. The ice is then allowed to warm. As the ice warms, the saline water or water containing other dissolved or miscible species drains out first. After sufficient saline water has drained, the remaining mass of ice contains fresh water having a much-reduced volume of salt trapped in the pore space of the ice mass. The ice or fresh water is then recovered.

Figure 1:
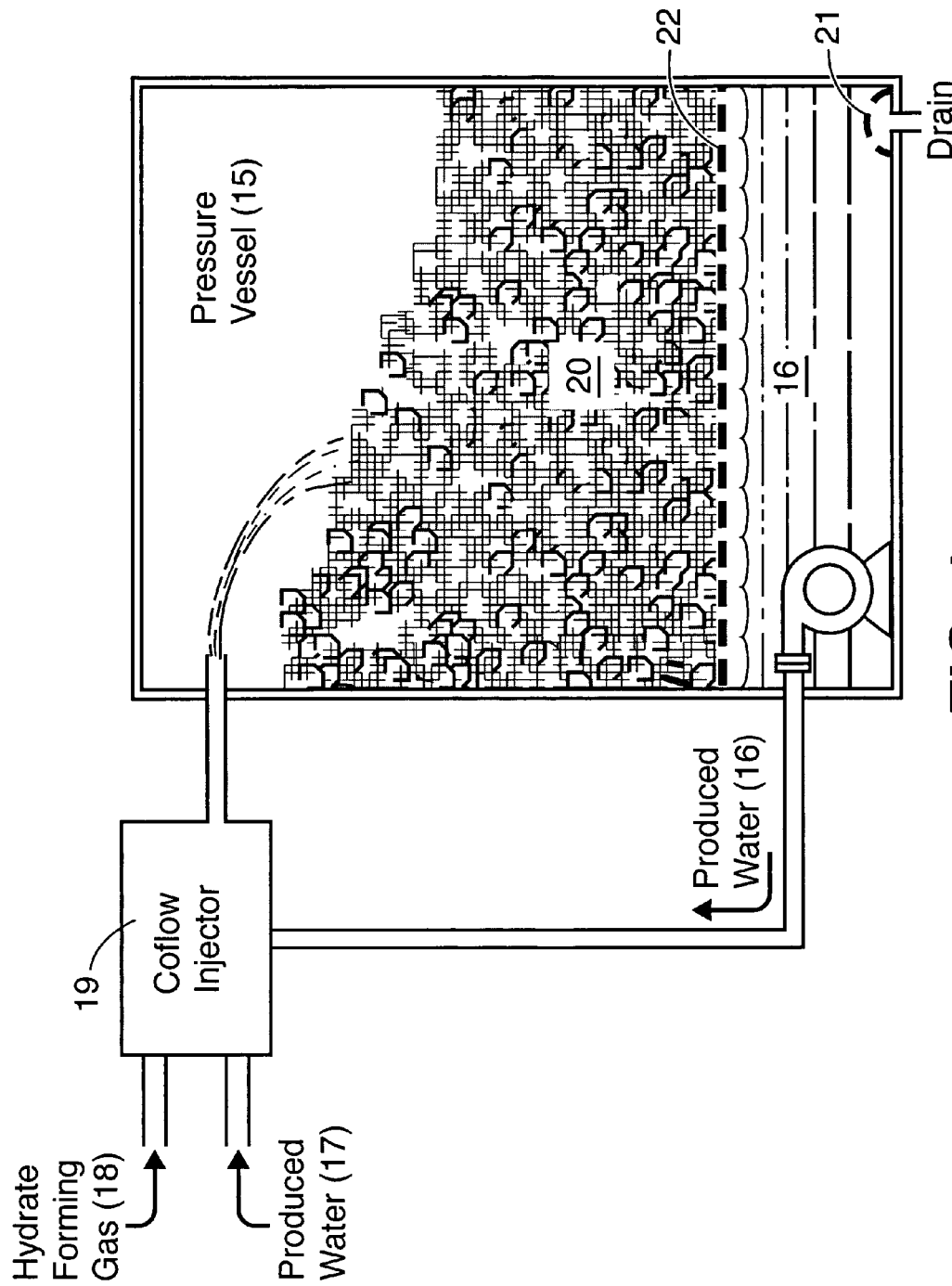
FIG. 1 illustrates the formation of solid and semi-solid clathrate hydrate in a coflow hydrate formation process using produced water.

A first preferred embodiment of the invention pertains to a coflow hydrate formation process using produced water. In FIG. 1, a pressure vessel 15 is initially empty or partially full of produced water 16. Hydrate is formed by injecting produced water 17 and a hydrate-forming gas 18 into the pressure vessel 15. A coflow injector 19 is used for this purpose. The hydrate that is formed may or may not have the same density as the produced water in the system. The pressure vessel 15 and coflow injector 19 may be such as described in Refs 4, 7 and 8, for example.

Natural gas is the preferred hydrate-forming gas because it is available at the wellhead. However, $CO_2$, methane or propane mixed gas hydrates could also be used. Hydrate formation is continued until the pressure vessel 15 contains a considerable mass 20 of a mixture of ice and clathrate hydrate. Production of the ice and clathrate hydrate mixture 20 is then stopped by turning off the flow of produced water 17 and hydrate-forming gas 18 to the coflow injector 19. A screen such as shown at 21 or 22 may be used in conjunction with a drain to remove the drain water that contains the runoff salts and other materials from the ice-like clathrate hydrate mass in the pressure vessel. A secondary separation effect can be carried out by rapid depressurization with subsequent water ice formation wherein the particular dissolved species is far less favored in the water ice and the solute becomes more concentrated in the free water.

An additional, optional step may be incorporated into the above method. It is also shown in FIG. 1. In the particular case where the pressure vessel 15 is partially full of produced water, rapid buildup of pressure in the pressure vessel may be avoided by recycling the unreacted produced water 16 from the pressure vessel 15 back through the coflow injector 19. This additional step also aids the hydrate formation kinetics in the coflow injector 19 because of the "memory effect" of water. The memory effect takes place when water that has been in coexistence with clathrate hydrate is reused to form hydrate.

Figure 2:
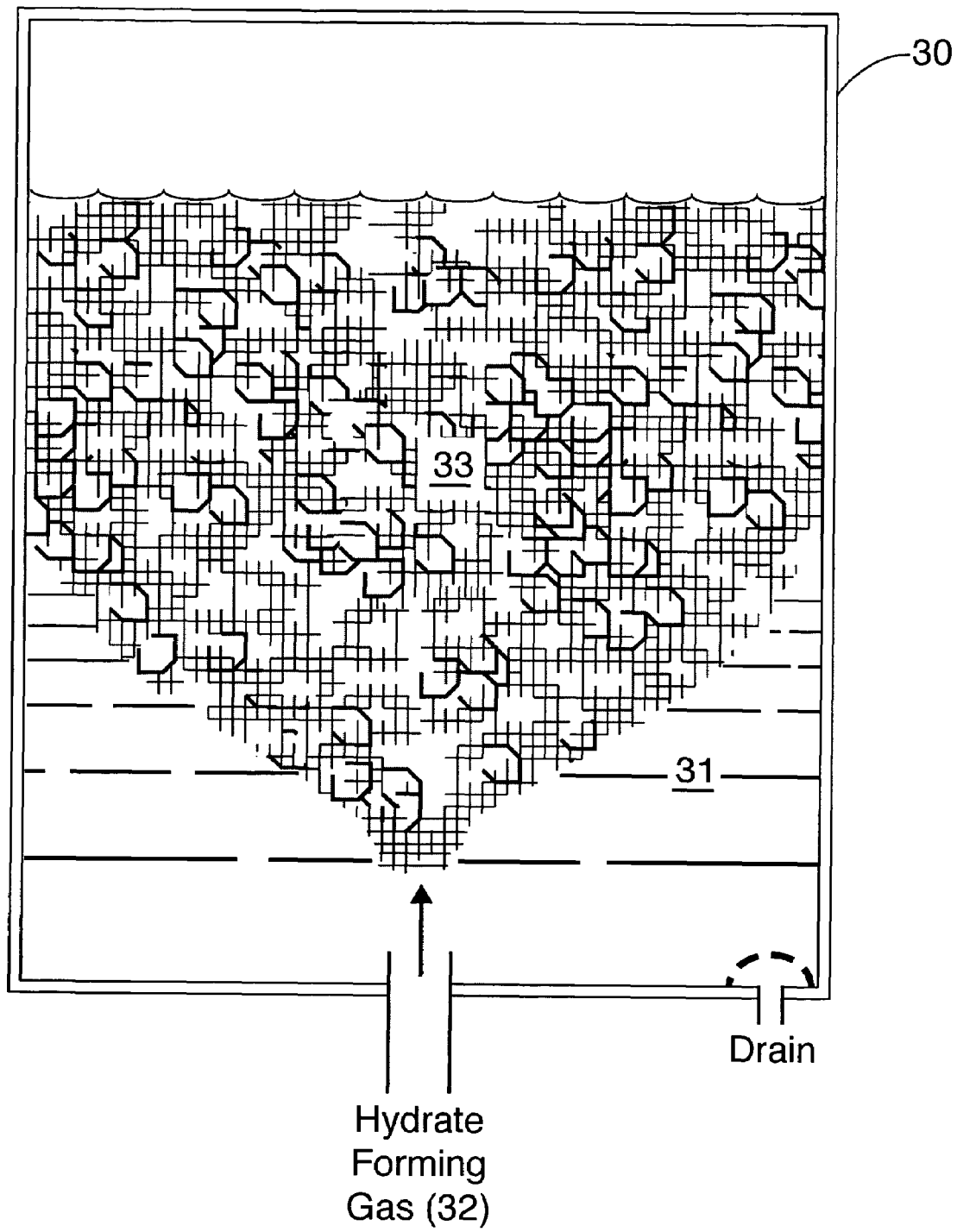
FIG. 2 illustrates the formation of solid and semi-solid clathrate hydrate in an alternate coflow hydrate formation process using produced water.

Another preferred embodiment of the invention, shown in FIG. 2, uses a different coflow hydrate formation process. In FIG. 2, a pressure vessel 30 is filled with produced water 31. A hydrate forming gas 32 such as natural gas, CO2, etc in the form of bubbles or drops is injected into the produced water 31 to form the solid or solid-like clathrate hydrate 33. Injection of the hydrate-forming gas 32 is continued until a predetermined pressure limit is reached in the pressure vessel 30. The injection is then stopped.

Figure 3:
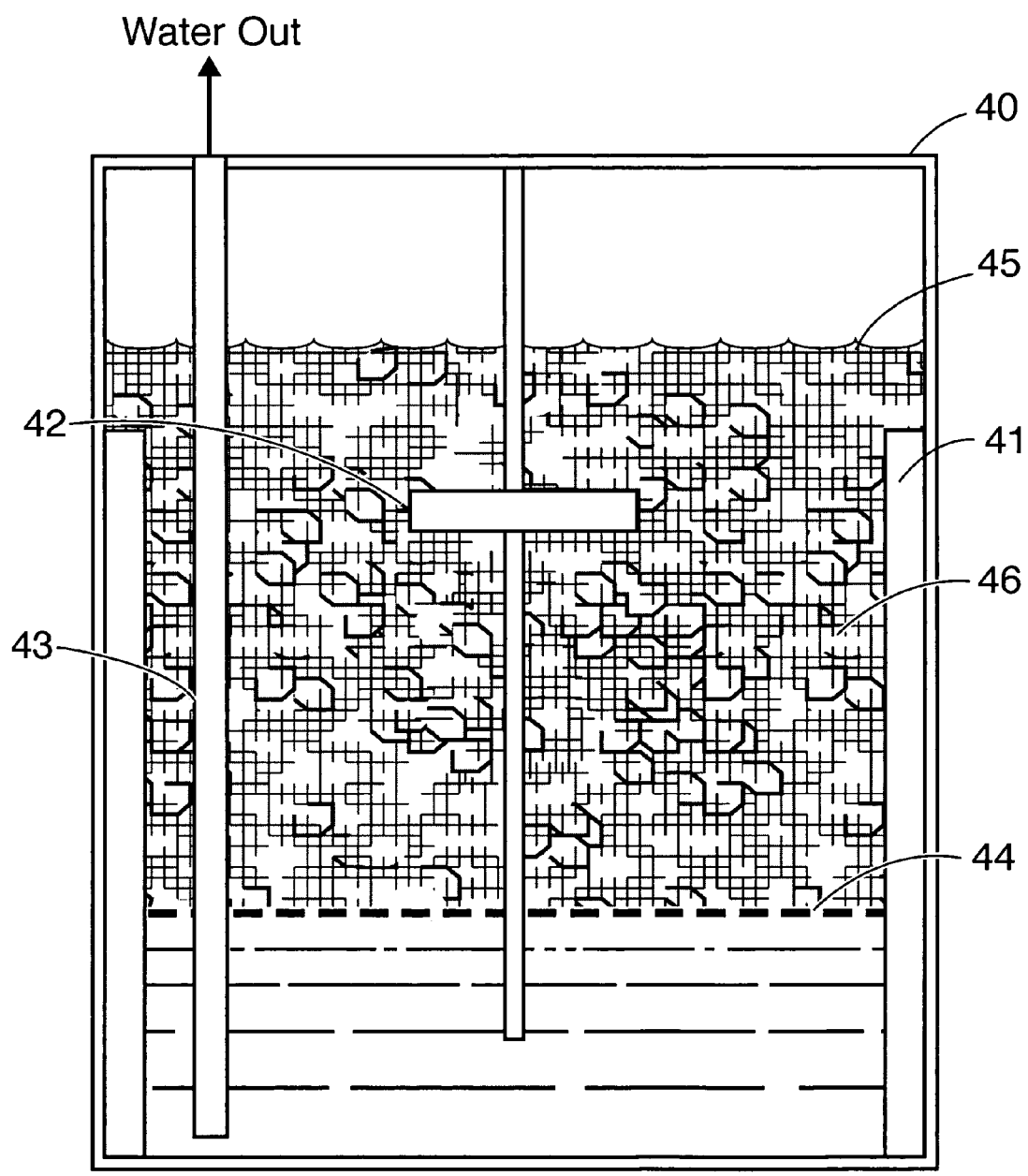
FIG. 3 illustrates the formation of solid and semi-solid clathrate hydrate in a stirred tank hydrate formation process using produced water.

A still different embodiment of the invention is based on a stirred tank hydrate formation process. In FIG. 3, a Parr pressure vessel 40 is used. Inside the vessel 40 are a baffle 41, impeller 42, drain tube 43, and screen 44. Produced water 45 nearly fills the pressure vessel 40. The baffle 41 and impeller 42 are used to promote mixing of a hydrate forming gas such as natural gas or $CO_2$ throughout the water 45. The drain tube 43 serves to remove excess water that has been excluded after hydrate formation. The screen 44 separates the ice/clathrate hydrate mass 46 from the excluded water and allows the excess water to drain. In this embodiment, the stirring impeller 42 may also be replaced by a vibrating, sonicating source or other instrument used to disperse the gas phase in the liquid phase to increase the gas-liquid interfacial area where hydrate formation occurs.

In the stirred tank apparatus of FIG. 3, hydrates are formed by first pressurizing the vessel 40 with $CO_2$, for example, below the hydrate stability point for approximately 15 minutes. This allows the $CO_2$ to dissolve into the water 45. The pressure is then ramped up to ~1000 psi, well above the equilibrium pressure, which induces hydrate formation in the water 45. The high pressure is not necessary, but does increase the rate of hydrate formation. The hydrates may be allowed to form for approximately one hour.

Turning now to the invention, a set of completion steps involving depressurization, ice formation and desalting is provided. These steps may be utilized with any of the above described hydrate formation methods. The completion steps comprise a method to remove salt and other soluble species from the ice-like clathrate hydrate structures produced in the pressure vessel embodiments of FIGS. 1-3.

In the case of the coflow injection formation methods illustrated by FIGS. 1 and 2, the starting point for the completion steps is that the pressure vessel contains a considerable fraction of clathrate hydrate and unreacted produced water. By "considerable fraction" it is meant that an upper pressure limit has been reached in the pressure vessel. Unreacted produced water is water that was excluded from the clathrate structure during formation.

The steps of the completion method for FIGS. 1 and 2 are as follows:

1) Drain the unreacted, more concentrated water, i.e., the water that was excluded from the hydrate structure.
2) Depressurize the pressure vessel rapidly to a low pressure. Rapid depressurization cools the water that is trapped in the clathrate hydrate cage and forms ice. Salts and other constituents of the produced water are rejected from the ice that forms. Some fraction of the salts are physically associated, i.e., sorbed onto the surface of the ice and clathrate hydrate. This cooling below the freezing point keeps the hydrate stable and unable to dissociate at this step.
3) Allow part of the ice to melt by exchanging heat with room temperature produced water. The rinsing/melting step removes a large part of the salts and other materials that migrated to the ice surface as the ice formed.
4) Remove the drain water that contains the runoff salts and other materials from the pressure vessel.
5) Allow the hydrate to dissociate by increasing the temperature of the pressure vessel. The fresh water may then be recovered from the pressure vessel. The last two steps may be carried out repeatedly to recover different portions of water having varying concentrations of salts and other materials. In the dewatering embodiment of the invention, the drain water would contain a concentration of a desired product, as could be the case for recovering acids or alcohols for subsequent purification (i.e., distillation).

The completion steps for the stirred tank embodiment of FIG. 3 are alike in substance to those for the coflow injection embodiments.

1) After allowing the hydrates to form for approximately one hour, the pressure is decreased to a pressure still well above the hydrate equilibrium pressure and the excluded water is drained from the pressure vessel using the drain tube, which allows the hydrate mass to rest on the screen.

2) The vessel is then cooled to 1.5° C. using an ethylene glycol circulator. The additional cooling provided by the ethylene glycol circulator may be unnecessary if cooling provided by rapid depressurization is sufficient or if the hydrate forming gas has a low equilibrium pressure.
3) Once the vessel reaches 1.5° C., the pressure is rapidly decreased to considerably below the equilibrium pressure. The rapid decrease in pressure serves to cool the vessel to approximately −4° C. The hydrate is now no longer stable, and the cold temperature of −4° C. serves to convert the hydrate mass to ice.
4) At this point, the vessel is allowed to warm, allowing the ice mass resting on the screen to slowly melt. The vessel is kept at ~100 psi and the melt water is drained from the vessel.
5) The vessel is then depressurized. The ice mass resting on the screen represents the freshest water, along with a small amount of liquid that remains at the bottom of the vessel.

EXAMPLES

Below is a summary of desalination experiments that have been performed in a 450 mL Parr pressure vessel. All the experiments started with NaCl water at a concentration of 35 ppt. Experiments always started with 370 mL of saltwater in the Parr Vessel (with the exception of experiments using the coflow injector). It was found that the primary controls on the final salinity of the water were the amount of hydrate that formed and the amount of washing allowed.

The table below summarizes the results of the desalination experiments. The most important column to note is the one titled "Ice Mass on Screen (Freshest H2O)". The ice mass on the screen (once melted) was the freshest water, or the final result of the desalination experiment. The "Excluded H₂O" is the water that is drained after hydrate formation is complete. The "Aliquots" are collected as the ice mass on the screen melts, and represent the washing cycle. It is also important to note that the wash cycle did not add any fresh water to the system, but melting of the ice mass was considered a wash step. The "Fluid Below Screen" represents the fluid that could not be collected using the sampling dipstick, and is essentially a third aliquot. In the early experiments the fluid below the screen and ice above the screen were combined to define the "Fluid below and ice mass above screen".

Brief Description of Experiments 1 through 8

The experiments used a technique that is being called the Hydrate to Ice Technique. Essentially the experiment begins with 370 mL of 35 ppt NaCl water in the Parr Vessel. Hydrates are then allowed to form. After hydrate formation, the excluded water is drained from the bottom of the vessel. As the water drains, the hydrate mass accumulates on an elevated screen situated in the Parr vessel. The vessel is kept cool in a cold room and a chilling circulator is sometimes used to keep the vessel cool. However, a rapid depressurization will also serve to cool the vessel. It is believed that water trapped inside the hydrate is converted to ice during the rapid depressurization to ~100 psi. Once the vessel is depressurized to 100 psi, it is removed from the chilling units and allowed to warm. As the ice (and hydrate) warm, the salt is washed off and accumulates as saltwater below the screen. The amount of water that is allowed to melt/wash helps to control the final salinity of the desalinated water. FIG. 3 shows the setup of the Parr vessel.

Experiment 1

In Experiment 1, the conductivity of the water above the screen was not measured because the screen in the Parr vessel was not installed yet. This was also the only experiment performed using a conductivity meter that had questionable accuracy. However, the final freshwater concentration was approximately 15-20 ppt. Hydrate formation persisted for 63 minutes and 21 mL of water were allowed to melt/wash. Out of 370 mL, the final volume of partially desalinated water was 138 mL.

Experiment 2

In Experiment 2, the produced desalinated water had a final concentration of 8.7 ppt. Hydrates were allowed to form for 66 minutes, and 120 mL of water was allowed to melt/wash. The final volume of partially desalinated water was 38 mL Experiment 3

In Experiment 3, produced desalinated water with a final concentration of 23.9 ppt was produced. Hydrates were allowed to form for 53 minutes and 95 mL of water was allowed to melt/wash. The final volume of partially desalinated water was 69 mL. It appears from these results that a shorter time period for hydrate formation and smaller wash/melt volume do not reduce the salinity as strongly.

TABLE 1

Summary of desalination experiment results.
C = Conductivity (mS); S = Salinity (ppt); and V = Volume (mL)

|  | Excluded H₂O | | | Aliquot 1 | | | Aliquot 2 | | | Ice Mass on Screen (Freshest H₂O) | | | Fluid Below Screen | | | Fluid below and ice mass above screen | | |
|---|---|---|---|---|---|---|---|---|---|---|---|---|---|---|---|---|---|---|
|  | C | S | V | C | S | V | C | S | V | C | S | V | C | S | V | C | S | V |
| Expt 1 | 62 | 30 | 211 | 56 | 25 | 21 | — | — | — | — | — | — | — | — | — | 28 | 15 | 138 |
| Expt 2 | 60 | 40 | 212 | 62 | 42 | 52 | 61 | 41 | 46 | 15 | 9 | 38 | 47 | 31 | 22 | 28 | 17 | 56 |
| Expt 3 | 60 | 40 | 223 | 61 | 40 | 48 | 60 | 41 | 18 | 38 | 24 | 69 | 55 | 36 | 29 | 41 | 26 | 98 |
| Expt 4 | 58 | 39 | 237 | 56 | 37 | 46 | 57 | 38 | 41 | 38 | 24 | 23 | 48 | 32 | 25 | 44 | 28 | 44 |
| [a]Expt 5 | 64 | 43 | 168 | 65 | 44 | 29 | 32 | 20 | 17 | 20 | 12 | 36 | — | — | — | — | — | — |
| [b]Expt 6 | — | — | — | — | — | — | — | — | — | 20 | 12 | 11 | 55 | 37 | 61 | — | — | — |
| [c]Expt 7 | 52 | 34 | 270 | 60 | 41 | 69 | — | — | — | 9 | 5 | 27 | — | — | — | — | — | — |
| [c]Expt 8 | 55 | 37 | 242 | 59 | 39 | 47 | 45 | 29 | 63 | 3 | 2 | 19 | — | — | — | — | — | — |

[a] = Four aliquots were actually taken, only the first and last are shown
[b] = Experiment 6 used the coflow injector. Multiple coflow injection arrangements were tested. Coflow experiments are described below.
[c] = Experiments using Snomax Experiment 4

In Experiment 4, produced desalinated water with a final concentration of 24 ppt was produced. Hydrates were allowed to form for 60 minutes, and 112 mL of water was allowed to melt/wash. The final volume of partially desalinated water was 23 mL. One possible reason for the high final concentration (24 ppt) could be due to the warmer temperatures that existed in the cold room. The cold room was not functioning correctly due to freezing. These warmer temperatures could have meant that hydrate was not forming at as rapid a rate as previous experiments.

Experiment 5

In Experiment 5, produced desalinated water with a final concentration of 12.2 ppt was produced. Hydrates were allowed to form for 112 minutes, and 165 mL of water was allowed to melt/wash. The final volume of partially desalinated water was 36 mL. This experiment attempted to repeat experiment 2, except a longer time span was allowed for hydrate formation. However, this time span did not seem to greatly increase the amount of hydrate that formed.

Experiment 6

A total of five coflow experiments were performed, during which five different coflow injection arrangements were tested (FIGS. 1, 2). In all experiments where a composite formed, it was very loosely consolidated and difficult to separate from the excluded water. To make a more consolidated composite, higher pressures would be required. These pressures are attainable in the Parr vessel, but constant venting is required to prevent from approaching the 2000 psi pressure limit. These experiments could be repeated in the 72 l Seafloor Process Simulator, but we would have to look for a conductivity/salinity increase in the vessel water as we inject through the coflow instead of a direct measurement of the injected composite. We could also attempt using liquid propane in the coflow injector, which would require only ~70 psi at 4° C., and the experiments could be conducted in the Parr vessel. The pressure problem is due to the Parr vessel having a small volume.

One coflow experiment did produce a fairly low desalinated concentration of 11.6 ppt. This final concentration was measured immediately after the composite was formed. Therefore, almost no time was allowed for washing. The composite that formed was loosely consolidated, but formed a reasonably solid mass upon depressurization.

Experiment 7

Experiment 7 was performed using the same general procedure as the first five experiments, except Snomax was added. Snomax is a crystal formation seed for the hydrate, and is available from York Snow, Inc. A surfactant may give the same beneficial effect as Snomax. Snomax was added at a concentration of 10 ppm to a 35 ppt NaCl water solution. Before the experiment, a standard curve was generated using Snomax and saltwater (and also with distilled water). It was found that Snomax does not affect the conductivity/salinity measurements at a concentration of 10 ppm. The final concentration of the desalinated water was 4.8 ppt. Hydrates were allowed to form for ~60 minutes, and 69 mL of water was allowed to melt/wash. The final volume of partially desalinated water was 27 mL. The addition of Snomax appears to be very effective at helping to reduce the salinity. This could be partially due to the hydrate morphology that resulted from this approach. The hydrate mass had much fewer $CO_2$ droplets coated by hydrate, and much more small flakes of hydrate.

Experiment 8

Snomax was again used to attempt to repeat the results observed in Experiment 7. The final concentration of the desalinated water was 1.6 ppt. Hydrates were allowed to form for 257 minutes and 110 mL of water was allowed to melt/wash. The final volume of partially desalinated water was 19 mL. The final volume of desalinated water was slightly lower than expected.

The use of a nucleation agent such as Snomax does appear to improve the desalination process. Primary controlling factors of the final salinity of the water are likely the amount of hydrate formed and the amount of water that is allowed to wash/melt.

The purification process described herein could be repeated to achieve higher purity water. If this technology were to be scaled up, it could provide desalination solutions in coastal environments or potential product concentration from aqueous solutions as in bio-alcohol formation.

The methods described herein are carried out in only a single pressure vessel. All earlier approaches have used multiple pressure vessels, i.e. a hydrate formation vessel and a dissociation vessel, or long tubes between vessels.

The invention claimed is:

1. A method for removing salts and/or other dissolved materials from water, the method comprising:
   (i) forming a solid or semi-solid clathrate hydrate by combining a hydrate-forming gas and water containing salts and/or other dissolved materials in a pressure vessel;
   (ii) depressurizing the pressure vessel to convert the solid or semi-solid clathrate hydrate structures into an ice-like clathrate hydrate mass;
   (iii) washing said ice-like clathrate hydrate mass to remove ejected materials that migrated to the surface of said ice-like clathrate hydrate mass during the depressurizing step; and
   (iv) melting the washed ice-like clathrate hydrate mass to recover purified water contained therein.

2. The method of claim 1 including additional cooling during said depressurizing step.

3. The method of claim 2 wherein said additional cooling is provided by a cooling circulator.

4. The method of claim 1 wherein said water containing salts and/or other dissolved materials is produced water from natural gas and oil production.

5. The method of claim 1 wherein a nucleation agent is utilized to aid the formation of the initial solid or semi-solid clathrate hydrate structures.

6. The method of claim 1 wherein the water containing salts and/or other dissolved materials and the hydrate-forming gas are mixed in a coflow injector under high energy mixing conditions prior to injection into the pressure vessel.

7. The method of claim 1 wherein forming the solid or semi-solid clathrate hydrate in step (i) includes application of a pressure of about 1000 psi.

8. The method of claim 1 wherein the depressurizing process of step (ii) is conducted such that the temperature of the clathrate hydrate is reduced to about −4° C. or less.

9. The method of claim 1 wherein the depressurizing process of step (ii) involves reducing the pressure from about 1000 psi to about 100 psi.

* * * * *